US 7,096,282 B1
Aug. 22, 2006

(12) United States Patent
Wille

(10) Patent No.: US 7,096,282 B1
(45) Date of Patent: Aug. 22, 2006

(54) MEMORY OPTION CARD HAVING PREDETERMINED NUMBER OF ACTIVATION/DEACTIVATION CODES FOR SELECTIVELY ACTIVATING AND DEACTIVATING OPTION FUNCTIONS FOR A MEDICAL DEVICE

(75) Inventor: Mark Wille, Horicon, WI (US)

(73) Assignee: Smiths Medical PM, Inc., Waukesha, WI (US)

( * ) Notice: Subject to any disclaimer, the term of this patent is extended or adjusted under 35 U.S.C. 154(b) by 0 days.

(21) Appl. No.: 09/364,067

(22) Filed: Jul. 30, 1999

(51) Int. Cl.
G06F 3/00 (2006.01)
G06F 13/00 (2006.01)

(52) U.S. Cl. .............. 710/8; 710/10; 710/14; 710/16; 710/100; 710/102; 710/103; 713/1; 713/100

(58) Field of Classification Search .............. 710/8, 710/10, 102, 14, 16, 100, 103; 713/1, 100
See application file for complete search history.

(56) References Cited

U.S. PATENT DOCUMENTS

| 5,265,607 | A | * | 11/1993 | Moberg | 600/383 |
| 5,371,692 | A | * | 12/1994 | Draeger et al. | 702/122 |
| 5,404,580 | A | | 4/1995 | Simpson et al. | 455/558 |
| 5,418,837 | A | * | 5/1995 | Johansson et al. | 455/558 |
| 5,442,541 | A | * | 8/1995 | Hube et al. | 364/138 |
| 5,500,517 | A | * | 3/1996 | Cagliostro | 235/486 |
| 5,606,978 | A | * | 3/1997 | Armstrong et al. | 600/524 |
| 5,705,798 | A | | 1/1998 | Tarbox | 235/379 |
| 5,870,726 | A | | 2/1999 | Lorphelin | 705/400 |
| 5,956,505 | A | * | 9/1999 | Manduley | 395/712 |
| 6,002,605 | A | | 12/1999 | Iwasaki et al. | 365/51 |
| 6,053,887 | A | | 4/2000 | Levitas et al. | 604/500 |
| 6,134,659 | A | * | 10/2000 | Sprong et al. | 713/190 |
| 6,223,348 | B1 | * | 4/2001 | Hayes et al. | 348/734 |
| 6,398,744 | B1 | * | 6/2002 | Bystrom et al. | 601/152 |
| 6,694,384 | B1 | * | 2/2004 | Moeller et al. | 710/8 |

FOREIGN PATENT DOCUMENTS

JP  363186318  *  8/1988

* cited by examiner

Primary Examiner—Tammara Peyton
Assistant Examiner—A. J.
(74) Attorney, Agent, or Firm—Louis Woo

(57) ABSTRACT

A device such as for example a electronic medical device has a memory that has prestored therein a number of programs or routines for performing various functions. Some of those functions are optional functions that were not enabled when the equipment was put into service. If the user of the equipment desires thereafter to activate any one of those optional functions, an options card that has a number of memory blocks each specifically configured to enable one of the prestored optional functions is sent to the user. The user can then insert the options card into a receptacle integrated into the device and, upon power up of the device, elect a menu for enabling the desired optional function(s) prestored in the device. The options card may be configured to have a count number that indicates the number of devices the card may be used for enabling a particular optional function. The options card may further be configured to include data that may be used to enable or disable multiple optional functions prestored in the device. When returned to the manufacturer, given that the serial numbers of the machines to which the options card was inserted are recorded therein, the manufacturer can easily keep tab of the status of those machines in the field that had had optional functions enabled/disabled.

31 Claims, 4 Drawing Sheets

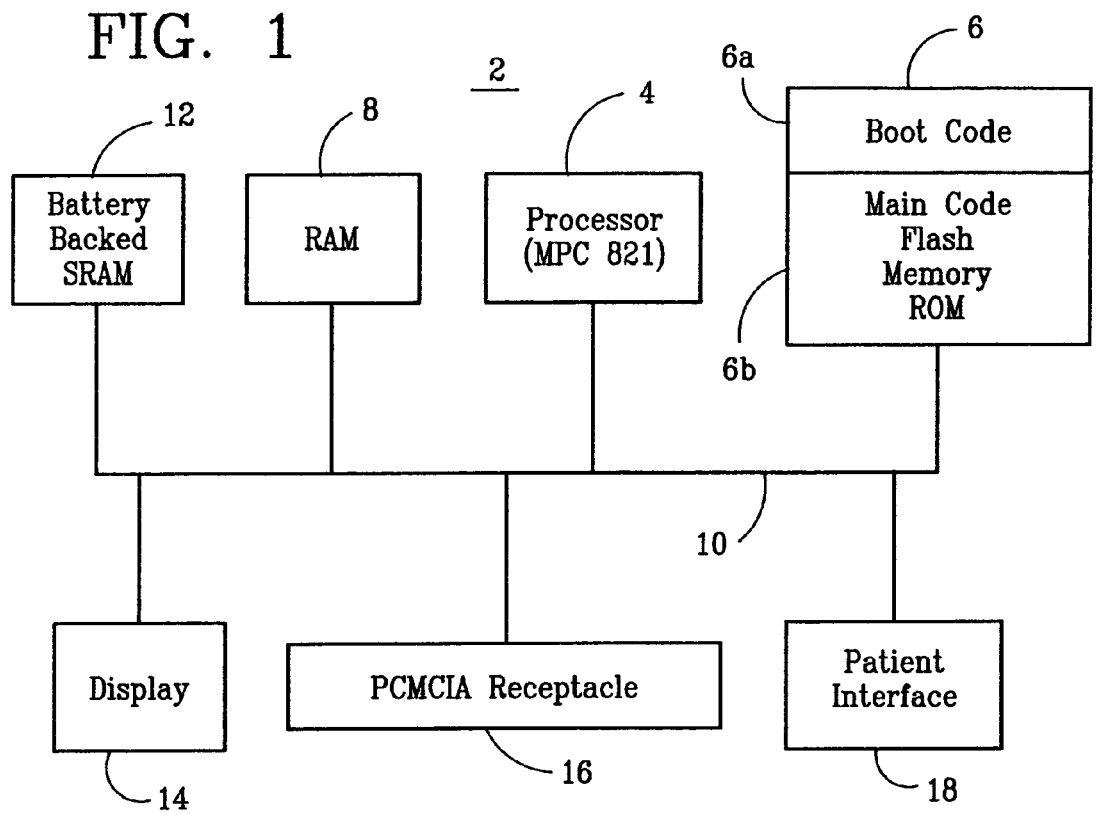
FIG. 1
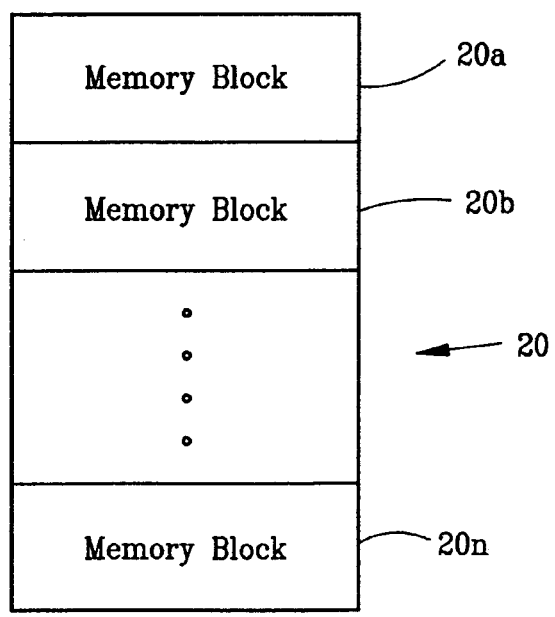

FIG. 2

| | Block Offsets | Field Name | Description | Data |
|---|---|---|---|---|
| 2a | 0-19 | ID String | Null terminated option card ID string | BCI OPTIONS |
| 2b | 20-23 | Checksum | Two's complement checksum from offset 24 to end of option block | |
| 2c | 24-27 | Not Used | | |
| 2d | 68-79 | Card Version | Null terminated card version string | V1.00 |
| 2e | 80-83 | Purchase Count | Total number of options purchased | |
| 2f | 84-87 | Used Count | Number of options used | |
| 2g | 88-91 | Total Serial Numbers | Count of the number of serial numbers listed below | Maximum number of serial numbers is 5000. |
| 2h | 92-END OF OPTIONS BLOCK | Serial Numbers | List of 12 byte serial numbers | |

20a

US 7,096,282 B1

MEMORY OPTION CARD HAVING PREDETERMINED NUMBER OF ACTIVATION/DEACTIVATION CODES FOR SELECTIVELY ACTIVATING AND DEACTIVATING OPTION FUNCTIONS FOR A MEDICAL DEVICE

FIELD OF THE INVENTION

The present invention relates to a multi-functional device and more specifically to a programmable device that has a number of optional functions stored therein some of which could be selectively activated.

BACKGROUND OF THE INVENTION

When an electronic device is put into service, oftentimes the internal programs for running the device or functions performed by such device require alteration or updating. This is done in the prior art by inputting into such device a new program or new update codes. Whitley et al. U.S. Pat. No. 5,590,373 discloses one such method of updating the programs in an electronic device, in this instance a field programmable personal communications device (PDI). To achieve the updating of the programs within the PDI, Whitley teaches that a PCMCIA (Personal Computer Memory Card International Association) card could be used. In particular, a new program is stored in the PCMCIA card and, upon insertion of this card into the appropriate receptacle of the PDI device, the new program is transferred into the electrically programmable read only memory (EPROM) of the PDI so that the functions performed by the PDI may be reconfigured. In otherwords, the program within the PDI is replaced by the new program fed thereinto by the PCMCIA card. It means that the PCMCIA card has to have sufficient memory, particularly when a large program is to be stored therein, for reconfiguring the PDI. Furthermore, problems may be encountered when updating the internal program of the PDI with the new program from the PCMCIA card, insofar as oftentimes some type of interaction has to take place between the user and the device, as the new program is being loaded into the PDI device.

The prior art further teaches that a memory card such as a PCMCIA card may be used for transferring information between a standalone device, such as for example a vending machine or a parking meter, so that data may be transferred between the memory card and the device. One such example is disclosed in Cagliostro U.S. Pat. No. 5,500,517 which discloses the use of a PCMCIA card for transferring information to a device for updating the cost for using the device and the prices of goods to be sold from the device.

In terms of medical devices, Armstrong et al. U.S. Pat. No. 5,606,978 discloses a heart monitoring device that has a slot for accepting an IC card, which contains specific control data that is used to control the programs stored in the device, to thereby control the operation of the device. Moberg U.S. Pat. No. 5,265,607 also discloses a medical device, in this instance an EEG monitor that includes a head box that has a housing adapted to be fitted with a configuration card. Such configuration card is electrically and mechanically compatible with the housing and is configured to provide a particular type of monitoring procedure so that a specific type of EEG waveform from the patient may be monitored.

In a medical environment, it is desirable that a care provider not be distracted by having to deal with the reprogramming of a device, as is required in the prior art discussed above. Moreover, any function to be performed by a device in a medical setting has to be reliable, i.e., it has to be fully tested when the device is put into service. Any tuning or tampering of the program in order to make it run properly in such medical device is unacceptable in a patient environment. Accordingly, a fool proof method of providing a new function to a device, especially a medical device, is required.

SUMMARY OF THE INVENTION

To meet the needs as noted above, the present invention electrical or electronic device, before it was shipped, is equipped with all of the programs for allowing the device to perform those functions it is capable of. These programs or routines may be in the form of firmware stored in a programmable read only memory (PROMS), an electrical PROMS (EPROMs), or in the case of the instant invention a flash memory ROM. All of these programs are fully tested before the equipment is shipped, so as to ensure that no problems would be encountered when those programs are activated in the device. When the equipment is shipped, only those functions that have been purchased by the user are enabled, i.e., the programs or routines that perform those functions are activated.

Once the device is put into service, if the user then desires additional functions be performed by the device, a token which may be in the form of a PCMCIA card or other memory cards, is sent to the user for input into a receptacle built into the device. The PCMCIA card is configured to have at least one memory block that stores the various data needed to recognize the machine, the kinds of programmable functions available in the machine, and most importantly the enablement of the desired optional function that has been prestored in the machine. The enabling of the purchased optional function may be done when the machine is powered up, after the PCMCIA card has already been mated to the receptacle of the machine.

In the case of an environment where different optional functions in a plurality of machines are to be enabled, the memory card is configured to have different memory blocks each adaptable to activate a particular optional function prestored in each machine. Thus, to enable the plurality of machines, the user only needs to take the same card and insert it into the respective receptacles of the different machines and, with the aid of a help menu, enable the different optional functions in the plurality of machines.

By thus enabling only those options the user desires, and yet at the same time having other options already built into the machine, the machine of the instant invention can therefore be quickly and easily updated with optional functions that a user desires after the machine has been shipped. The user therefore does not need to know beforehand or pay for the kinds of functions that he might need in the future. Moreover, instead of having to manufacture a machine specifically for a particular customer, by enabling only those functions that the particular customer needs, a multi-functional device can be sent to all of the customers, with particular functions being selectively enabled or activated for particular customers.

It is therefore an objective of the present invention to provide a device having multiple functions some of which could be activated after the device has been shipped simply by the insertion of an options card.

It is another objective of the present invention to have a device which functions can be readily reconfigured without having to have it returned to the manufacturer, by simply sending to the user a card that will enable the particular functions desired by the user.

It is still anther objective the present invention to enable a user to activate a particular function in a plurality of devices by using the same options card.

BRIEF DESCRIPTION OF THE DRAWINGS

The above-mentioned objectives and advantages of the present invention will become apparent and the invention itself will be best understood by reference to the following description of an embodiment of the invention taken in conjunction with the accompanying drawings, wherein:

FIG. 1 is a simplified block diagram illustrating the major components of the device of the instant invention and the token used for selectively activating optional functions stored in the machine;

FIG. 2 is a diagram of one memory block resident in the token memory card shown in FIG. 1;

DETAILED DESCRIPTION OF THE INVENTION

Figure 3:
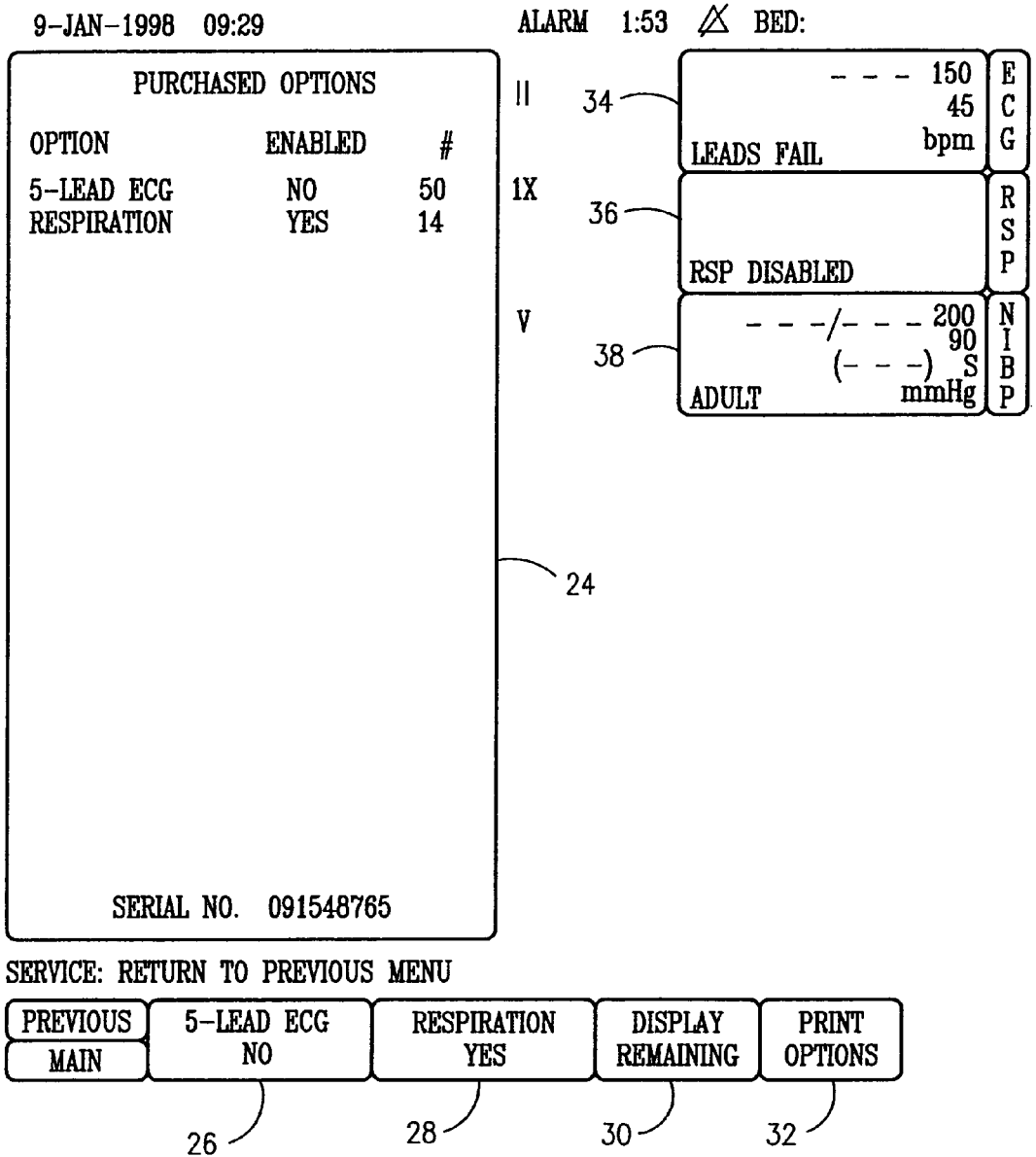
FIG. 3 is a display of a menu that is presented to a user for activating selective optional functions prestored in the device of FIG. 1.

An electronic programmable device, such as for example the SIMS BCI ADVISOR monitor, usually is made up of a number of components. As represented by the equipment 2 shown in FIG. 1, the components in the device usually include a processor 4, a read only memory (ROM) 6, a working memory in the form of a random access memory (RAM) 8, and a bus 10 to which all of the components are interconnected. For the instant invention, ROM 6 is divided into two sections, namely a section 6A that stores the boot up program and a section 6B that stores the various programs or routines for processor 4 to perform the various functions the machine is capable of.

The equipment of the instant invention, for example the aforenoted ADVISOR monitor, is further shown in FIG. 1 to include a battery backed static RAM (SRAM) 12, a display 14, a receptacle 16 and a patient interface 18. Patient interface 18 may comprise a number of interfaces for connecting sensors to a patient so as to receive physiological data from the patient. Receptacle 12, for the exemplar ADVISOR monitor of the instant invention, is a PCMCIA port to which a token means, such as for example a PCMCIA card 20, is matable with.

Device 2 operates as follows. A number of functions are stored in ROM 6B. For the exemplar ADVISOR monitor, these functions include for example invasive blood pressure (IBP), temperature, ECG, 5-lead ECG, and respiration (RSP). Functions that may also be stored in ROM 6B include non-invasive blood pressure (NIBP) monitoring. Of course, other functions for monitoring additional physiological data from a patient may also be prestored in ROM 6B. For the instant invention, depending on what was required and purchased by the customer, at the time that the equipment was shipped, one or more of the function programs stored in ROM 6B are disabled.

When powered on, the boot up program in ROM 6A would initiate the operation of equipment 2. The overall control of equipment 2 is done by processor 4, which, upon sensing the enabled programs from ROM 6B, would begin operations of those functions related to those programs are available in equipment 2. For example, a patient may be connected to blood pressure sensors, by means of patient interface 18, so that device 2 can begin to monitor the blood pressure of the patient. Ditto for other physiological data such as for example the ECG and the temperature of the patient. For the exemplar ADVISOR monitor device, waveforms representing substantially real time measurements of the physiological data of the patient are shown on display 14.

For the exemplar ADVISOR device 2, assume the user was not desirous of and indeed had not purchased the 5-lead ECG and RSP functions at the time the monitor was shipped to him. Consequently, those two functions became optional functions that remain stored in ROM 6B. In fact, the user did not know that those two optional functions were prestored in ROM 6B. All he knew was that those functions were optional functions that he may purchase at a later date.

As shown in FIG. 1, the PCMCIA card 20 is represented by a number of memory blocks 20a, 20b to 20n. Each of the memory blocks is the same and is shown in detail in FIG. 2. A memory block, for example memory block 20a, is shown to include a number of data fields that are made up of a number of bytes. These are bytes 0–19 which make up field 22a, bytes 20–23 which make up field 22b, bytes 24–27 which make up field 22c, bytes 68–69 which make up field 22d, bytes 80–83 which may up data field 22e, bytes 84–87 which make up data field 22f, bytes 88–91 which make up data field 22g and bytes 92 to the end of memory block which make up data field 22h. Data field 22a is an ID field which includes information that tells the monitor that it is an options card. Data field 22b is a checksum field used during the power up of the device. Data field 22c informs the monitor of the version of the options card. Data field 22e provides a count of the total number of options that have been purchased with the card. This is used when the card is to be used to enable the same optional function in a multiple number of devices. Data field 22g provides a count of the number of serial numbers of the devices for which the card is usable for. And data field 22h records the serial numbers of those devices to which the card had been inserted for enabling the option.

Thus, upon the powering up of device 2, with options card 20 having been inserted into receptacle 16, processor 4 will first read the information in the SRAM 12 to determine which functions have been enabled, so as to retrieve the programs relating to those functions from ROM 6b and write those programs into the working memory, i.e., RAM 8. Thereafter, for those options in SRAM 12 that have not been enabled at the time that the machine was shipped from the factory, a comparison is made with the various memory blocks in options card 20 to make a determination on whether or not any one of those optional functions prestored in the device should now be enabled. And if for example one of the options were to be enabled per options card 20, the disable flag in SRAM 12 for that functions is switched, at which time the appropriate program or routine in memory ROM 6b is retrieved and written onto RAM 8. That optional function then becomes operational in device 2.

Given that options card 20 has a plurality of memory blocks 20, it is conceivable that more than one optional function is to be enabled in device 2. For example, the user may wish to enable both the 5-lead ECG and the RSP respiration functions in exemplar device 2.

In SRAM 12, the various purchased options are defined by means of code updates. For the example at hand, assume again that the 5-lead ECG and respiration RSP optional functions were not purchased prior to shipment of device 2. The flags in SRAM 12 representing those functions were therefore not enabled for device 2. And those optional functions would not be enabled ordinarily when device 2 is turned on. There is however one exception.

To wit, on power up, device 2 checks the options block of SRAM 12 to determine whether there has been any change in the options indicated as being enabled for device 2. If it so happens that SRAM 12 becomes corrupted (due to for example a dead battery which is highly unlikely insofar as the battery for the SRAM would last approximately 10 years), if the information stored in SRAM has been corrupted, or if there has been a change in the SRAM or a new revision, then those options that previously had not been enabled will be defaulted to an enabled state.

In terms of design, the options block in SRAM 12 contains a single word that has bit mapped option flags added. Also added is a 12 byte field containing a serial number up to 11-bytes plus a null character. Each time device 2 is powered on, the optional functions for that device are checked. For example, if the 5-lead ECG has not been purchased, display 14 of device 2 will only present a waveform that is presentative of a 3-lead ECG mode, as the 5-lead ECG function is disabled. Similarly, if the respiration function has not been purchased, it likewise remains disabled.

When the user wants to enable those functions that had previously been stored in ROM 6b but had not been enabled due to whatever reason, a screen such as that shown in FIG. 3 is presented to the user at display 14 for the enabling of prestored functions in device 2. To retrieve the purchased options menu of FIG. 3, options card 20, which may be a PCMCIA card, is inserted into receptacle 16. Note that PCMCIA card 20 may in fact be a 2 meg PCMCIA flash card.

As shown, the menu presented in FIG. 3, for the exemplar ADVISOR monitor device, is termed a "Purchased Options" menu. Given that the optional functions of 5-lead ECG and respiration were prestored in the memory of device 2, those two optional functions are shown in the Purchased Options menu box 24. Note too that the serial number of the device is shown at the bottom of menu box 24.

Further with respect to FIG. 3, insofar as the functions of device 2 that had not been enabled when device 2 was shipped were the 5-lead ECG and respiration functions, the software flags in options card 20 that are associated with the 5-lead ECG and respiration functions would indicate that neither one of those functions has been purchased. And since the purchased flag for those functions has been disabled, the exemplar monitor device 2 is automatically set to the 3-lead mode and the respiration parameter box is removed from the screen so that no respiration menu item appears.

Returning to FIG. 2, note that there are three numbers of import stored in options card 20. These numbers are represented by data fields 22e, 22f and 22h. The first number is the total number of purchases made by the user, i.e., the Purchase Count. This count enables the same card to be used to activate the same optional function in a plurality number of the same type of devices. For example, if a hospital has 100 of the exemplar ADVISOR monitors and the 5-lead option had previously not been purchased for each of those monitors, then by putting in 100 at the purchased count data field 22e, the user can insert the same options card into each of those monitors to activate the 5-lead ECG option in each of those monitors.

The second number of import in options card 20 is the number of purchases used, i.e., "Used Count" as represented in data field 22f. This number represents the number of purchases that have been used, with a listing of the serial numbers of the monitors for which the option was enabled. The last number of significance in the memory block of options card 20 is the number of serial numbers listed for the options, as shown in data field 22g.

The maximum number of purchases for a particular function or parameter on any one options card 20 of a device, for the exemplar ADVISOR monitor, is 5000. For tracking purposes, the serial numbers of the devices are added or removed from a list, such as that indicated in data field 22h, on options card 20 each time that option is enabled or disabled for a particular device.

To access the Purchased Options screen, as for example that shown in FIG. 3, a user, if needed, would enter a password. For the exemplar screen shown in FIG. 3, note that the optional respiration function has been enabled, as a "yes" is noted under the "enabled" column. Also with respect to the respiration function, note that a number "14" next to the enable function indicates that there are 14 purchases remaining for the respiration optional function on the PCMCIA card. Likewise, looking at box 24, it can be seen that the optional function 5-lead ECG has not be enabled with the options card 20, and moreover that there are 50 purchased counts remaining on the options card so that, if desired, the 5-lead ECG optional function could be enabled in 50 of the exemplar ADVISOR monitor devices.

Looking at the lower portion of exemplar screen of FIG. 3, note that box 26 confirms that the 5-lead ECG optional function has not been enabled for the particular device 2. Moreover, box 28 confirms that the optional function of respiration has indeed been enabled. Box 30 indicates that there is at least one display remaining in the options menu of FIG. 3. Box 32 provides an indication that the screen of FIG. 3 may be printed.

On the top right-hand portion of the screen displayed in FIG. 3 are boxes 34, 36 and 38. These boxes illustrate the various functions being performed by the exemplar monitor device. For example, box 34 shows that the exemplar monitor device is capable of performing the ECG function. In this case, insofar as it is assumed that electrodes have not been connected to the patient, box 34 shows that there is a "leads fail". The dashes in box 34 represents the potential numbers that may be displayed. For example, if there is a connection to a patient and the ECG from the patient is 120, then 120 would be displayed in box 34. Similarly, box 36 shows that the RSP function has been disabled. Again, this is due to the fact that it is assumed that no sensors have been connected to the patient. Lastly, the non-evasive blood pressure (NIBP) function is shown in box 38.

As was mentioned previously, for the exemplar monitor device 2, when a default of the purchased options takes place, as for example when the software is updated from an older version to a current version or when a problem develops at SRAM 12, those optional functions prestored in the machine but not previously enabled would automatically default to an enabled mode. And as the option flag is toggled from "no" to "yes", options card 20 is searched by processor 4 for a serial number in field 22h that matches the serial number of the machine. If the serial number of the machine is not already listed on the card for the options selected, it will be added to the card and the purchases remaining on the count in data field 22e will be decremented by a given amount, such as for example 1. Going hand-in-hand with that is the increment in data field 22f in which the used count is incremented by the same amount. If, on the other hand, the serial number for the machine already exists on options card 20 for the options selected, options card 20 will not be debited but the option will nonetheless be enabled.

Conversely, if an option is to be disabled from a device that is out in the field, options card 20 will be searched for a serial number that matches the serial number of the machine. If such serial number is located, it will be removed from the list. Whether or not the serial number is located on the card, the purchases remaining count will be incremented by one. The reason that options card 20 is credited whether or not the serial number exists is for those instances where a parameter is enabled in the factory but not recorded on the card that the user or distributor is using. Thus, if in fact an option has been enabled in the factory and now is to be disabled, the options card should be credited with a count so that an additional device having the same option may be enabled, without additional costs to the holder of the options card.

With the serial numbers of the devices recorded in the options card 20, when options card 20 is returned to the manufacturer, the manufacturer can download the information stored in options card 20 so that an accurate record of the devices out in the field and the different options enabled/disabled in those machines can be kept.

Figure 4:
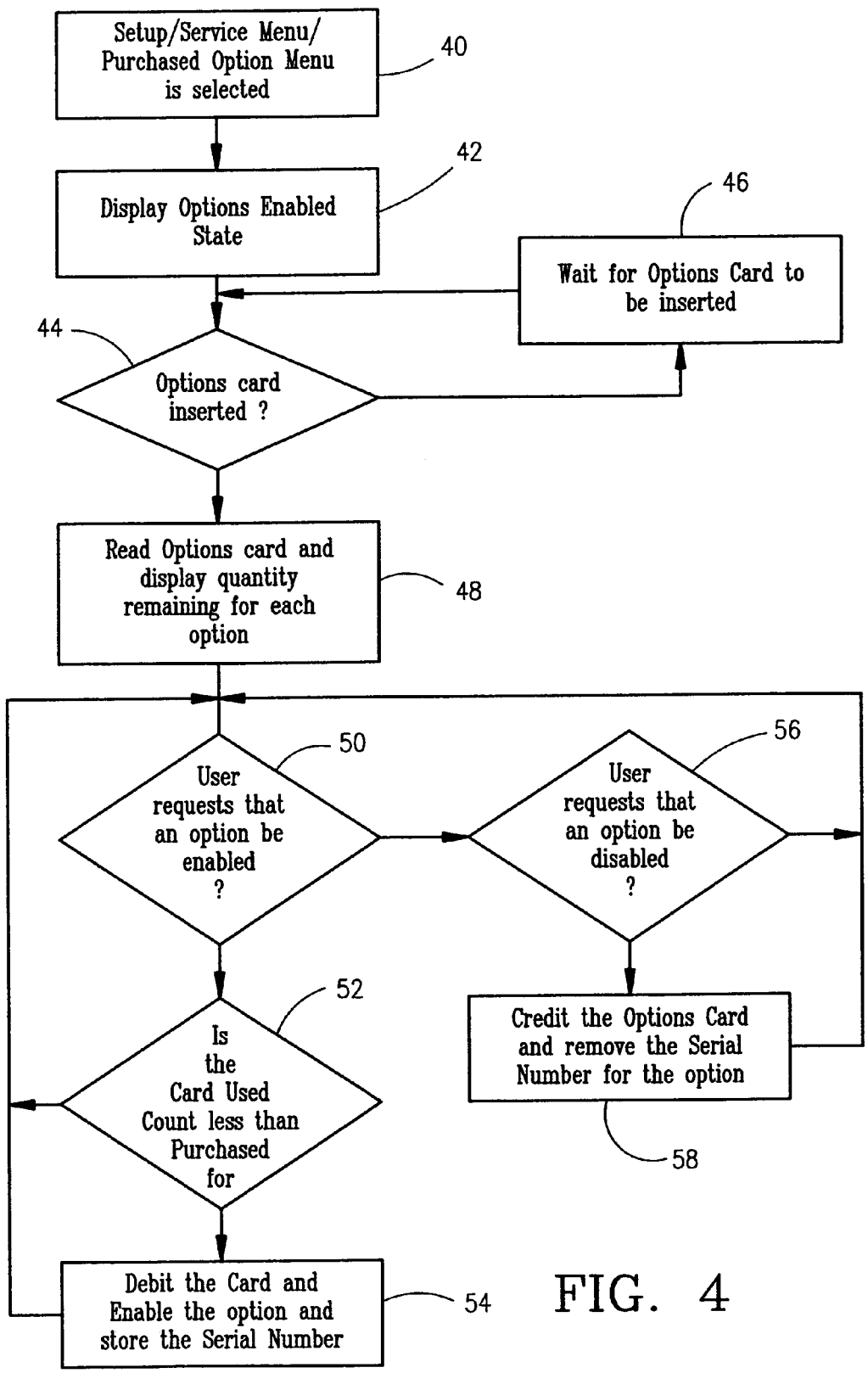
FIG. 4 is a flow chart illustrating the operation of enabling selected optional functions prestored in a device of the instant invention by using an options card of the instant invention.

With reference to FIG. 4, the interaction between options card 20 and device 2 is illustrated. Starting with step 40, once options card 20 has been inserted into receptacle 16, a user would select "set up/service/purchased option" menu. In other words, there are three layers to the exemplar menu in FIG. 3. The reason that the menu shown in FIG. 3 is provided in multiple layers is so that a password may be provided to protect access to the menu. This ensures that someone who has not been trained, such as for example a doctor for the exemplar ADVISOR monitor, could not get into the menu and start making selections without knowing exactly what he is doing. Putting it differently, for the exemplar ADVISOR monitor device, a hospital technician probably would be user who should be given the password for gaining access to the options menu.

Once the menu is entered into, a screen such as that shown in FIG. 3 is displayed. Such display shows the enable state for each of the options, per step 42. Processor 4 next determines whether an options card has been inserted into receptacle 16 per step 44. If an options card is not detected, the user is prompted to insert the card and device 2 waits, per step 46, until an options card is detected. Thereafter, per step 48, the data stored in options card 20 is read and the quantity of counts remaining for each of the optional functions in the card is displayed.

When the user requests that an option be enabled, per step 50, options card 20 is checked to make sure that the number of purchases used on that card is less than the count that was originally purchased for that option, per step 52. If not, since the count for activating or enabling that particular function has been used up, the process returns to step 50 to wait for the user to make another request. On the other hand, if the used count is determined to be less than the purchased count for that option, then that option count in the options card is debited and the serial number of the machine is recorded onto the options card, per step 54. In other words, the used count for that card for that particular option is incremented. Thereafter, the process returns to step 50 to continue to monitor whether another request has been input by the user.

In addition to being able to enable selected optional functions, selected functions prestored in device 2 that are optional when the machine was shipped or were enabled thereafter, could also be disabled by the user using the PCMCIA options card 20. To disable an enabled optional function, the user would request that an option be disabled, per step 56. The process, upon detecting such a request, would credit the options card with a count and also remove the serial number of the machine from the card, per step 58. If no disable request is sensed, the process returns to step 50 to wait for the next request by the user. Likewise, once a disabled request has been received and the appropriate count has been credited to and the serial number of the machine removed from options card 20, the process will return to step 50 to await further input requests. The process as shown in FIG. 4 ends when the user elects to exit the purchased option menu.

Inasmuch as the present invention is subject to many variations, modifications and changes in detail, it is intended that all matter described throughout this specification and shown in the accompanying drawings be interpreted as illustrative only and not in a limiting sense. For example, even though an exemplar medical monitor was described hereinabove for illustrating the instant invention, it should be apparent to those skilled in the art that the instant invention is also applicable to other programmable electronic or electrical equipment. Accordingly, it is intended that the invention be limited only by the spirit and scope of the hereto appended claims.

The invention claimed is:

1. A multi-functional device, comprising:
   memory means for pre-storing a number of programs or routines each for performing a number of functions, at least one of said functions being an optional function at the time said device was first put into operation, said optional function adaptable to be in an activated mode and a deactivated mode; and
   an input port means for accepting a memory card, said memory card having at least one code stored therein that selectively activates and deactivates said optional function for said device and other devices that have stored therein said optional function, said memory card including a count number that predetermines the number of devices that said token means can activate;
   wherein said memory card inserted into said input port, said optional function pre-stored in said memory means is selectively enabled and disabled by said one code stored in said memory card, said optional function remaining in the selected mode for said device thereafter.

2. Device of claim 1, wherein said memory means comprises a ROM for storing said programs or routines, further comprising:
   a RAM for storing at least the program or routine that is to be run by said processor means to perform a function;
   a static RAM for storing a number of parameters each for enabling or disabling one of the functions performed by a corresponding one of said programs or routines stored in said RAM.

3. Device of claim 1, wherein said memory card comprises a PCMCIA flash memory card having a non-volatile memory for storing at least one activation or deactivation code for enabling or disabling a particular prestored function in said device.

4. Device of claim 1, wherein said device is a medical instrument having a display.

5. Device of claim 1, wherein said memory card comprises a PCMCIA flash memory card having a non-volatile memory for storing at least one activation or deactivation code for activating or deactivating one of said parameters stored in said static RAM so as to enable or disable a corresponding one of said functions stored in said RAM.

6. Device of claim 1, wherein said memory card comprises a PCMCIA flash memory card, said memory card being adaptable to be used to provide said one code to other devices;
   wherein after said memory card has been used to selectively enable and disable said prestored optional function in said device, said predetermined count number is selectively decremented and incremented, respectively, by a given amount; and
   wherein said memory card thereafter can be used to selectively enable and disable said optional function prestored in said other devices, said memory card being useable for selectively activating and deactivating said optional function prestored in all said other devices, said given amount being decremented and incremented, respectively, after the selective activation and deactivation of said optional function in each of said other device.

7. Device of claim 1, wherein said functions prestored in said device include at least ECG, RSP, NIBP and 5-lead ECG.

8. Device of claim 7, wherein said ECG and RSP functions are functions that are operational at the time said device is put into operation.

9. Device of claim 1, wherein said device is a monitor having a plurality of sensing means connectable to a patient for collecting and displaying physiological data from said patient.

10. A memory card to be inserted into a receptacle of a device for selectively activating and deactivating at least one optional function prestored in said device, said prestored optional function adaptable to be performed by said device, comprising:
   at least one memory block for storing data to selectively activate and deactivate one particular optional function stored in said device, said memory block having a number of data fields including one that contains a preset count number that allows said memory card to be used to selectively activate a and deactivate said one particular optional function in said device and in other devices having the same said particular optional function prestored therein so that said optional function, upon selective activation and deactivation, becomes a selective active and inactive operational function, respectively, in said device and said other devices thereafter independent of said memory card, said preset count number being decremented and incremented by a given amount each time said memory card is inserted into the receptacle of each of said other devices for selectively activating and deactivating, respectively, said particular optional function in said each other device, said memory card being usable for selectively activating and deactivating other optional functions in said device and said other devices.

11. Memory card of claim 10, wherein one of said data fields is used to store the serial or identification numbers of the devices having functions enabled by said memory card.

12. Memory card of claim 10, wherein one of said data fields is used to store a number representing the amount decremented from said preset count number.

13. Memory card of claim 10, further comprising:
   a plurality of memory blocks each adaptable to activate a corresponding optional function prestored in said device and said other devices.

14. Memory card of claim 10, wherein said device is a device having a display for displaying a menu to prompt a user to selectively activate at least said one particular optional function prestored in said device after said memory card is inserted into said receptacle.

15. Memory card of claim 10, wherein said device is a medical device.

16. A medical device adaptable for performing a number of functions, comprising:
   a first memory store for prestoring a number of programs or routines each for performing one of said functions; and
   a port for accepting a token, said token having a memory for storing data including multiple codes at least one of which is adaptable to selectively enable and disable a selective one of said programs or routines stored in said first memory store;
   a second memory store for storing data that provides an indication of the respective operational status of said functions;
   wherein to enable and disable said particular prestored function in a selected mode, upon insertion of said token into said port, a corresponding one of said codes stored in said token is provided to said second memory store to indicate said particular prestored function should be selectively enabled and disabled, said particular prestored function in said device thereafter remaining in the selected mode after said token is removed from said port.

17. Device of claim 16, wherein said device is a medical multi-function monitor.

18. Device of claim 16, wherein said first memory store comprises at least one RAM.

19. Device of claim 16, wherein the data in said second memory store is alterable by the data stored in said token when an options menu is selected from said device after said token has been inserted into said port, and any function desired to be enabled chosen from said options menu.

20. Device of claim 16, wherein said token comprises a PCMCIA flash memory card having at least one memory block including a plurality of data fields for enabling a particular prestored function in said device after said memory card is inserted into said port.

21. Device of claim 20, wherein said memory card includes a predetermined count number, said memory card being adaptable to be used to provide activation codes to other devices;
   wherein after said memory card has been used to enable said particular prestored function in said device, said predetermined count number is decremented by one, and said memory card thereafter can be used to enable said particular prestored function in other devices that have said particular prestored function so long as said predetermined count number is greater than zero.

22. Device of claim 20, wherein said memory card comprises an other memory block including a plurality of data fields for enabling an other function prestored in said device after said memory card is inserted into said port.

23. Device of claim 16, wherein said functions prestored in said device include at least ECG, RSP, NIBP and 5-lead ECG.

24. Device of claim 23, wherein said ECG and RSP functions are operational functions built into said device that are not selectively enableable by said token.

25. Device of claim 14, wherein said device is a monitor having a plurality of sensing means connectable to a patient for performing said functions to collect and display physiological data from said patient.

26. Device of claim 23, wherein one of said data fields of said memory card is used to store the serial or identification numbers of the devices having functions enabled by said memory card.

27. A multi-functional medical device, comprising:
processor means;
memory means for prestoring a number of programs or routines for performing a corresponding number of functions, at least one of said functions being an optional function selectable to be operable at the time said device was first shipped;
an input port for accepting a memory card, said memory card having at least one code stored therein for selectively activating and deactivating said optional function in said device and other devices that have the same optional function prestored therein, said memory card including a count number that determines the number of devices said memory card can activate;
a bus for interconnecting said processor means, said memory means and said input port;
wherein, with said memory card inserted into said input port, said one code stored in said memory card is read on power up of said device for selectively activating and deactivating said optional function prestored in said memory means.

28. Device of claim 26, wherein said device is a monitor that has a number of sensing means connectable to a patient for collecting physiological data from said patient by performing said functions.

29. Device of claim 26, wherein said memory card comprises a PCMCIA flash memory card being adaptable to be used to provide said one code to an other device;
wherein after said memory card has been used to enable said prestored optional function in said device, said predetermined count number is decremented by a given amount; and
wherein said memory card thereafter can be used to enable said optional function prestored in said other devices, said memory card being useable for activating all said other devices that have prestored therein said optional function, said given amount being decremented after the activation of said optional function in each of said other devices.

30. Device of claim 26, wherein said functions prestored in said device include at least ECG, RSP, NIBP and 5-lead ECG.

31. Device of claim 26, wherein said ECG and RSP functions are operational functions when said device is first put into service.

* * * * *